(12) United States Patent
Kalisz

(10) Patent No.: US 6,422,511 B1
(45) Date of Patent: Jul. 23, 2002

(54) SUPPORT SYSTEM FOR GROUND TESTING AN AIRCRAFT

(75) Inventor: John Kalisz, Newhall, CA (US)

(73) Assignee: Lockheed Martin Corporation, Palmdale, CA (US)

( * ) Notice: Subject to any disclaimer, the term of this patent is extended or adjusted under 35 U.S.C. 154(b) by 0 days.

(21) Appl. No.: 09/898,840

(22) Filed: Jul. 5, 2001

(51) Int. Cl.[7] .................................................. B64F 1/12
(52) U.S. Cl. ............................... 244/114 R; 244/100 A
(58) Field of Search ........................... 244/107, 114 R, 244/100 A, 101; 73/1.78, 1.79, 493, 488

(56) References Cited

U.S. PATENT DOCUMENTS

| | | | | |
|---|---|---|---|---|
| 3,467,343 A | * | 9/1969 | Violleau | |
| 3,507,466 A | * | 4/1970 | La Fleur | |
| 4,165,059 A | * | 8/1979 | Summer | |
| 4,757,962 A | * | 7/1988 | Grant | |
| 5,765,778 A | * | 6/1998 | Otsuka | |

* cited by examiner

Primary Examiner—Charles T. Jordan
Assistant Examiner—Tien Dinh
(74) Attorney, Agent, or Firm—Robert A. Schruhl

(57) ABSTRACT

The invention is a system for supporting a vertical take off and landing aircraft during hover tests about the ground, the aircraft having a longitudinal, vertical, and lateral axis, a nose landing gear and a main landing gear positioned rear therefrom on either side of the longitudinal axis. In detail, the system includes a bearing assembly, preferably and air bearing assembly positionable under the nose and each main landing gear. An air cushion assembly mounted to each of the air bearings with the air cushion assembly detachably coupled to each landing gear. Preferably, the air cushion assemblies are coupled to the landing wheel axles. Thus the bearing assemblies allow horizontal motion above the ground and the air cushion provides for vertical movement of the aircraft above the ground.

9 Claims, 10 Drawing Sheets

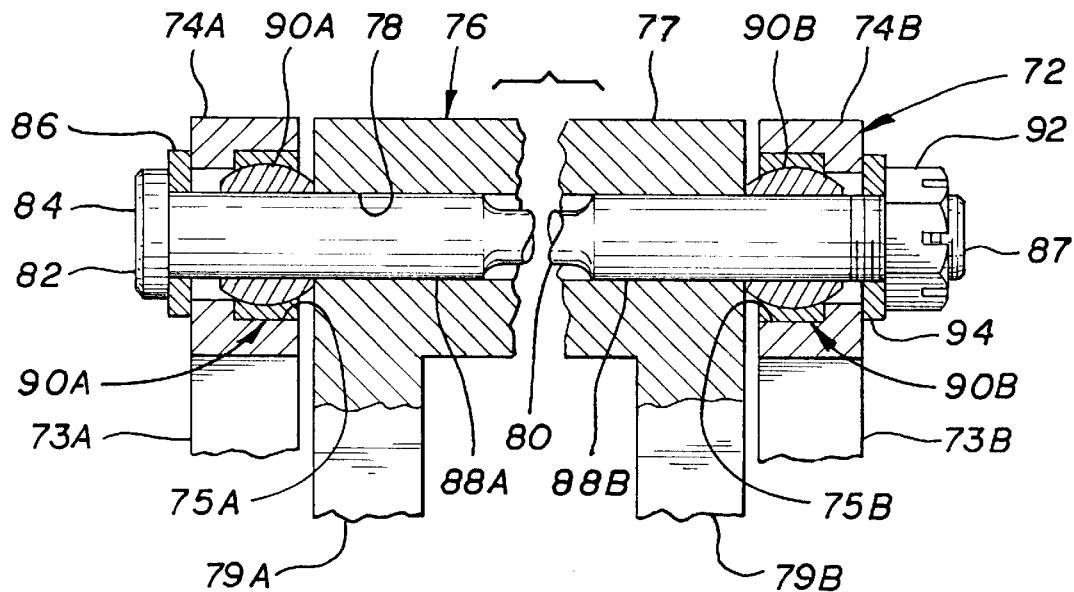

SUPPORT SYSTEM FOR GROUND TESTING AN AIRCRAFT

BACKGROUND OF THE INVENTION

1. Field of the Invention

The invention relates to the field of test equipment for aircraft and, in particular, to a support and restraint system for testing a vertical takeoff and landing aircraft during ground testing.

2. Description of Related Art

Fixed wing aircraft with closed loop control systems are subjected to a structural coupling test to insure there is no coupling between the inertia of the control surfaces, and the vehicle management sensors (VMS) that can cause a destructive feedback. The high frequency, 10 Hz, of the control system, generally allows the test to be run with the aircraft on its landing gear, and with the tires slightly deflated, providing a 2 ½ to 3 Hz support system. The controls are powered by an external hydraulic system. The stable gear and low power make it an inexpensive and low risk approach. The coupling, that is always found, is easily filtered in the VMS, once identified.

However, on certain vertical takeoff and landing aircraft such a system will not work effectively. The X-35B Joint Strike Fighter proposed by the Lockheed Martin Corporation is unique in the vertical lift flight mode. During this phase the vehicle is supported on a cold thrust post of air in the front of the aircraft (behind the cockpit) and a hot thrust post at the rear of the aircraft using a swiveling nozzle and a pair of under wing thrusters for roll control. The VMS closes the control loops on these effectors in pitch, roll and yaw to provide stable flight. The aircraft's response to these effectors is expected to come from both inertial feedback of the heavier devices, and pneumatic control force response from low inertia, high thrust effectors. All of these effectors are coupled to the engine through the VMS and the engine full authority digital control (FADC). To explore the structural coupling of the vertical lift system, the propulsion system must be powered. The difficulty of this task is the extra soft support required and the high power settings necessary on the aircraft for testing. The ideal test set up is one that would allow low initial power settings, and be adjustable to handle increasing power settings up to full power settings without requiring major changes in the test setup.

Thus, it is a primary object of the invention to provide a system for ground testing an aircraft to determine potential problems in the flight control system.

It is another primary object of the invention to provide a system for ground testing a vertical takeoff and landing aircraft to determine potential problems in the flight control system that is simple to adjust.

It is a further object of the invention to provide a system for ground testing a vertical takeoff and landing aircraft to determine potential problems in the flight control system that is inexpensive to manufacture.

SUMMARY OF THE INVENTION

The invention is a system for supporting a vertical take off and landing aircraft during hover tests about the ground, the aircraft having a longitudinal, vertical, and lateral axis, a nose landing gear and a main landing gear positioned rear therefrom on either side of the longitudinal axis. In detail, the system includes a bearing assembly, preferably an air bearing assembly positionable under the nose and each main landing gear. An air cushion assembly is mounted to each of the air bearings with the air cushion assembly detachably coupled to each landing gear. Preferably, the air cushion assemblies are coupled to the landing gear wheel axles. Thus the bearing assemblies allow horizontal motion above the ground and the air cushions provide for vertical movement of the aircraft above the ground.

A first restraint assembly is coupled between the nose landing gear and the ground positioned along the longitudinal axis, second and third restraint assemblies are coupled between the main landing gear and the ground parallel to the longitudinal axis; third and fourth restraint assemblies are coupled between the main landing gear and the ground extending laterally outward from each side of the aircraft, and fifth and sixth restraint assemblies are coupled between the fuselage aft of cockpit of the aircraft and the ground extending latterly outward from each side of the aircraft; These restraint assemblies bias the aircraft to a centered position.

Preferably each restraint system incorporates a cable assembly that includes a first cable having first and second ends, with the first end attached to the to the aircraft. A second cable is included having first and second ends, with the first end attached to the ground. A spring assembly is attached to and between the second ends of the first and second cables. The spring assembly preferably includes a first wheel assembly coupled to the second end of the first cable and a second wheel assembly coupled to the second end of the second cable. A first tube is attached by its first end to the first wheel assembly. A second tube is attached to the second wheel assembly and the second end is in slidable engagement with the second end of the first tube.

A device to induce sliding resistance between the second ends of the first and second tubes is incorporated. It includes the second end of the second tube having an inwardly tapered threaded end with the tapered end having a plurality of longitudinal grooves forming a plurality of semi-flexible fingers. A rut is threadably engagable with the threaded end of the second end of the second tube. Thus when the nut is treaded onto the second end of the second tube, the plurality of semi-flexible fingers are forced in contact with the second end of the first tube increasing the friction between the first and second tubes.

A biasing spring is coupled between the first and second wheel assemblies for resisting movement of the first and second wheel assemblies apart from each other. Preferably the biasing spring is a plurality bungee cords attached between the first and second wheel assemblies.

The air cushion assemblies include first and second air cushions mounted on the air bearing assemblies in a spaced relationship. A "T" shaped structural member having first and second arms and a leg with the leg extending. downward between the first and second arms positioned on top of the first and second air cushions, respectfully. The landing gear wheel axle is mounted to the arm of the T shaped member. A beam, having first and second ends, is attached by its first end to the air bearing assembly, and extends vertically upward from one end of thereof. A positioning arm is pivotally connected to the second end of the beam and also pivotally connected to arm of the T shaped member. Thus the T shaped member is movably mounted to the air bearing assembly.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 7 is a partial cross-sectional view of FIG. 3 taken along the line 7—7.

FIG. 8 is a partial cross-sectional view of FIG. 3 taken along the line 8—8

DESCRIPTION OF THE PREFERRED EMBODIMENT

Figure 1:
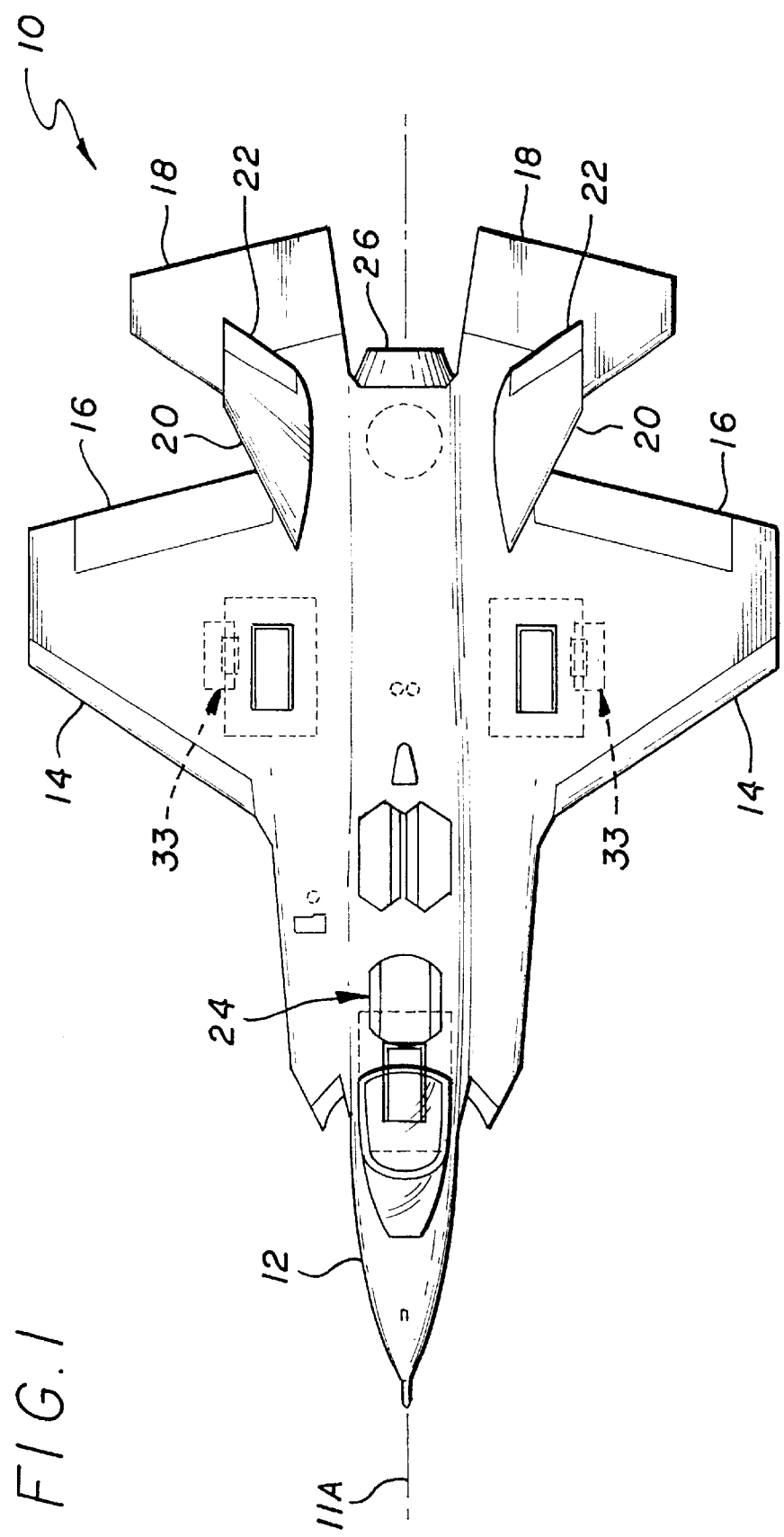
FIG. 1 is a plan view of a vertical takeoff and landing aircraft.
Figure 2:
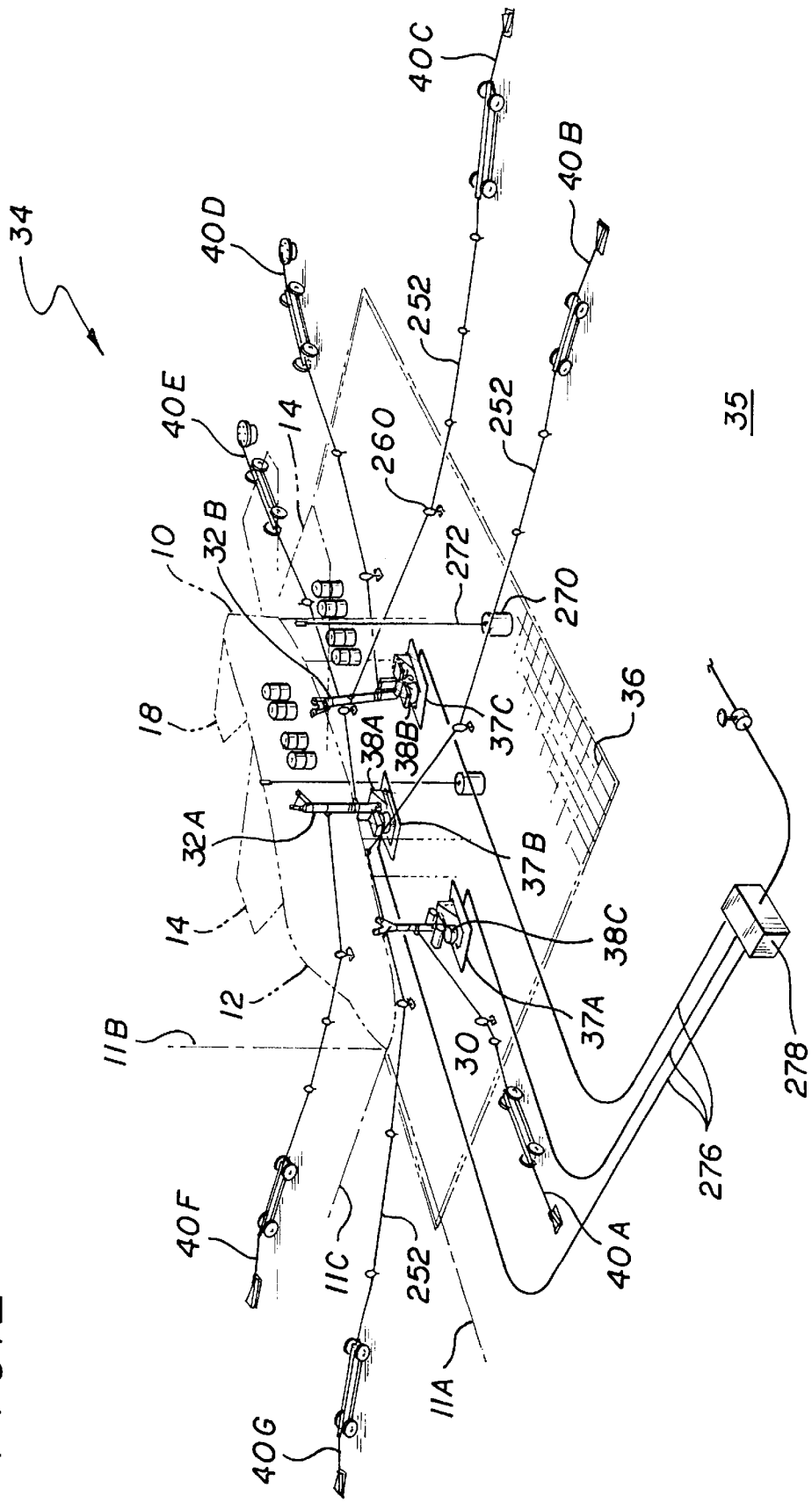
FIG. 2 is a perspective view of the support system with an aircraft installed for testing.

Illustrated in FIGS. 1 and 2 is a Joint Strike Fighter Aircraft having vertical takeoff and landing capabilities. In detail, the aircraft, generally designated by numeral 10, includes a longitudinal axis 11A, vertical axis 11B and lateral axis 11C. The aircraft 10 further includes fuselage 12, wings 14 with ailerons 16, horizontal stabilizers 18 and vertical stabilizers 20 with rudders 22. A vertical lift fan 24 and swiveling engine exhaust nozzle 26 for directing exhaust downward during vertical takeoff and landing are also included. Also illustrated are the nose and main landing gear, indicated by numerals 30 and 32A and 32B. In addition roll control nozzles 33 are located in the wings 14.

The support system, generally designated by numeral 34, is used to support the aircraft 10 during the vertical lift and aft-vectored structural-coupling tests. The system 34 is designed to provide very low rigid body frequencies. to allow the control system to operate as nearly as possible to actual flight conditions, while operating at less than full power and while maintaining a level of positional control over the ground 35. The system 34 is intended. to be operated over a pit (not shown) covered by a steel grid 36, but for engine-off operations, could be utilized indoors. Mounted on top of the grid 36 are steel pads 37A, 37B and 37C positioned under the nose and main landing gears 30, 32A and 32B, respectively. The system 34 has four major elements. Three of the elements are the support assemblies 38A and 38B that couple to the main landing gear 32A and 32B and support assembly 38C that couples to the nose landing gear 30, in a manner to be subsequently discussed. The fourth element comprises seven restraint assemblies 40A–G attached between the aircraft 10 and the ground that are designed to maintain (bias) the aircraft in a centered position.

Restraint assembly 40A attaches to the nose landing gear 30 limiting backward movement along the longitudinal axis 11A. Restraint assembly 40B is attached to the left side of the fuselage and restricts movement along the lateral axis 10B to the right. Restraint assembly 40C is attached to the left main landing gear 32A and restrains movement to the right along the lateral axis 11B. Restraint assembly 40D is attached to the main landing gear 32A and limits forward motion along the longitudinal axis 11A. Restraint assembly 40E is attached to the main landing gear 32B and limits forward motion along the longitudinal axis 11A. Restraint assembly 40F is attached to the right main landing gear 32B and restrains movement to the left along the lateral axis 11B. Restraint assembly 40G is attached to the right side of the fuselage and restricts movement along the lateral axis 11B.

Figure 3:
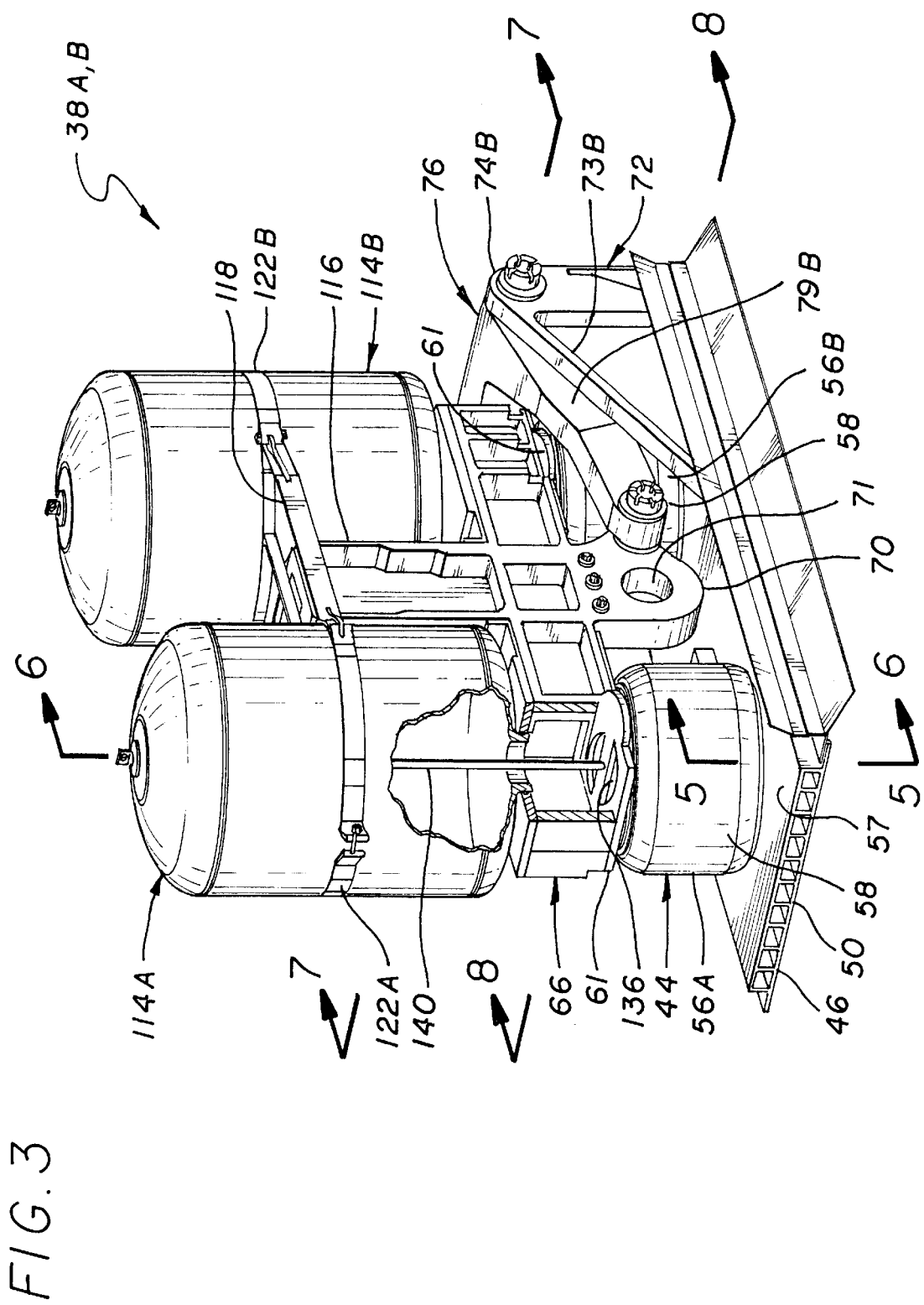
FIG. 3 is a perspective view of the main landing gear support assembly.
Figure 4:
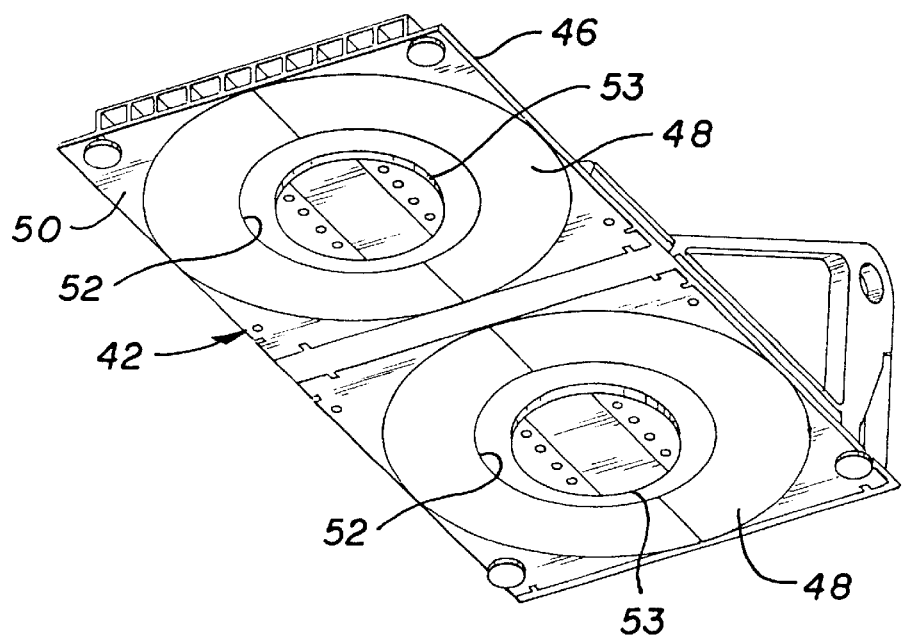
FIG. 4 is a view of the underside of the main landing gear support assembly illustrating the air cushions mounted in a support plate.
Figure 5:
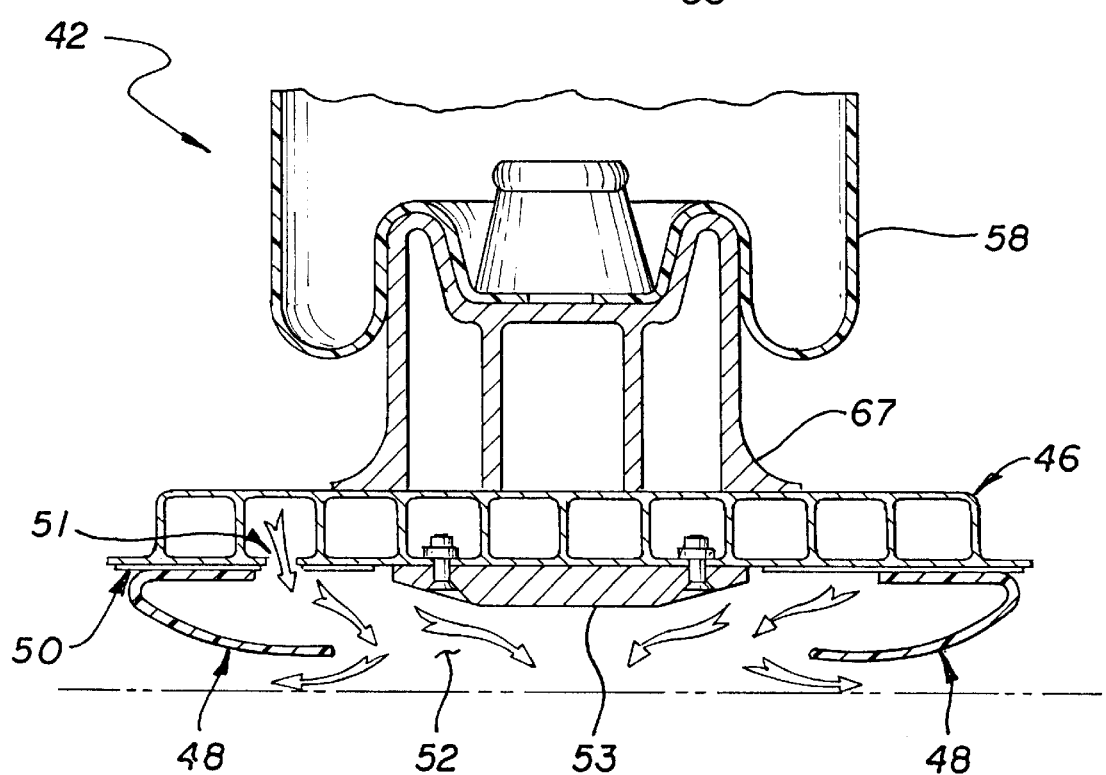
FIG. 5 is a partial cross-sectional view of FIG. 3 taken along the line 5—5 illustrating the air cushions.

Still referring to FIG. 2 and additionally to FIGS. 3 and 4, the support assembles 38A, 38B and 38C are almost identical with each other except that support assembly 38C mounts accumulators in a slightly different manner. The support assemblies 38B and 38C include an air caster or air bearing 42, positioned over pads 37B and 37C, respective. These air casters 42 lift the vehicle about an inch above the pads and provide a near frictionless movement along the longitudinal and lateral axis 11A and 11B Air spring assemblies 44, which will be subsequently discussed support the vehicle and provide a very low spring force along the vertical axis 11C. The air casters 142 are common to all three support assemblies 38A–C and include an extruded flat plate 46 mounting two air annular skirts 48 on the under surface 50. Such devices are well known in the art and need not be discussed In great detail. Suffice it to say when pressurized, the annular skirts 48 expand and air 51 exits the center hole 52. Thus air flows out around the annular skirts 48 and the plate 46 rides upon a thin layer of air. In this application, the air casters are sized such that they are energized with high flow, low-pressure (25 psi) air from a source (to be subsequently discussed): Support pads 53 are used to support the aircraft 10 when the air casters 42 are not energized.

Figure 6:
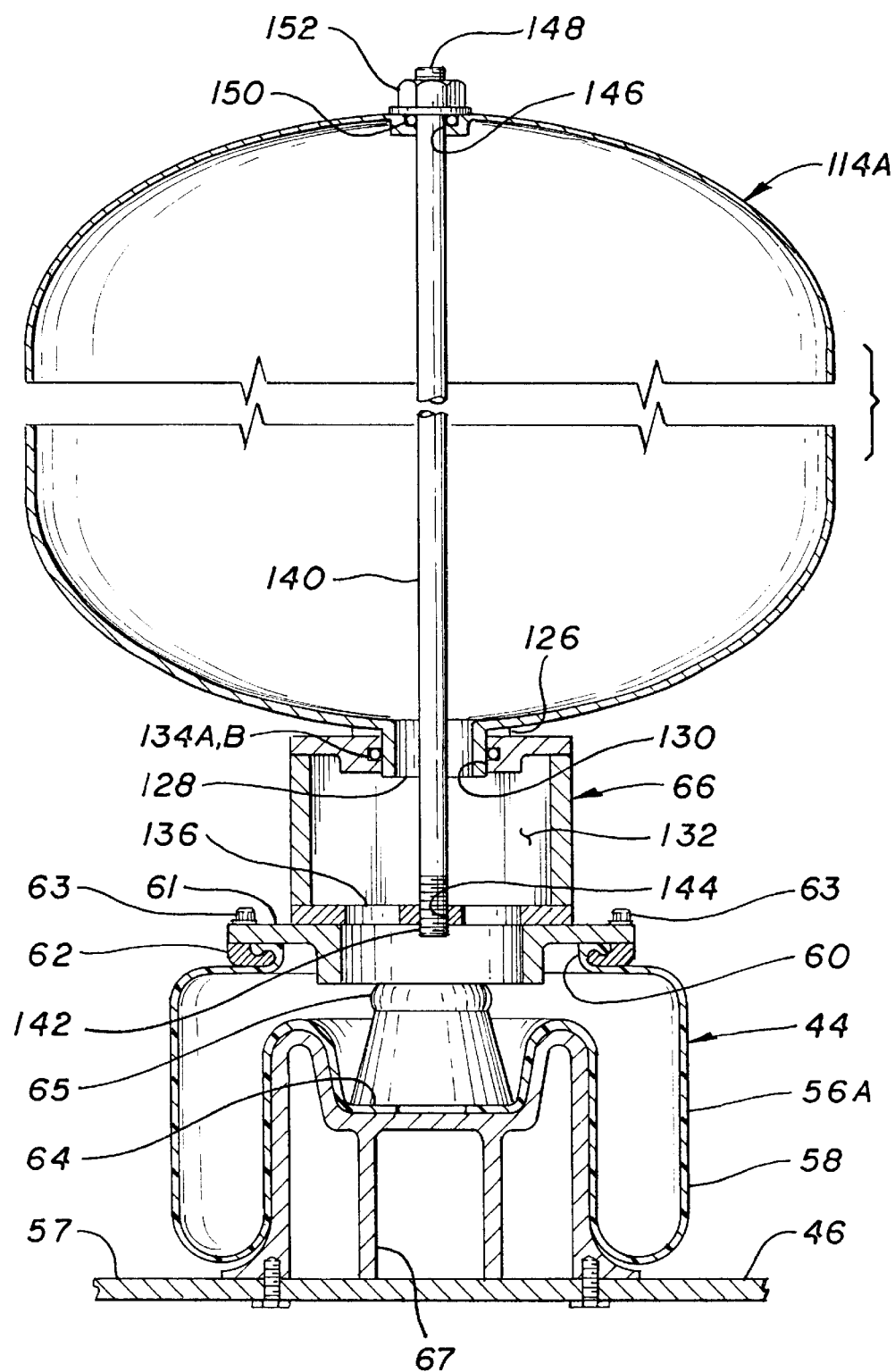
FIG. 6 is a partial cross-sectional view of FIG. 3 taken along the line 6—6.

Still referring to FIG. 3 and to FIG. 6, the previously mentioned air spring assembly 44 further includes a pair of air springs 56A and 56B mounted on the top surface 57 of the plate 46. Such air springs are well known and available from numerous sources, thus their construction need not be discussed in detail. Suffice it to say, the air springs 56A and 56B each include a flexible bags 58 coupled at its top end 60 to a support plate 61 (the details of which will be subsequently discussed) by means of a retainer ring 62 and fasteners 63. The bag 58 extends downward and then upward with its second end 64 joined to a support column 67 mounted to the surface 57. The support column 67 also includes a "snubber" 65, which prevents the air bag 58 from being totally collapsed.

Still referring to FIG. 3 and additionally to FIGS. 7 and 8, a "teeter" beam 66 having a T shape with arms 68A and 68B includes the previously mentioned plate 61 as their bottom surface to which the air springs 56A and 56B respectively, are attached. The teeter beam 66 further includes a central leg 70 extending downward between the two airbags 56A and 56B. The leg 70 includes a bore 71 for mounting the wheel axle of the main landing gear 32A or 32B. A vertical beam assembly 72 is mounted on one end of a top surface 57 of plate 46 having side supports 73A and 73B and flanges 74A and 74B with holes 75A and 75B therewithin. A U shaped beam 76, having central member 77 with a hole 78 therethrough and having two arm members 79A and 79B, is pivotally mounted to the beam 72 between the flanges 74A and 74 by means of a shaft 80. The shaft 80 includes a first end 82 terminating in an end cap 84 with a thrust washer 86 mounted between it and the flange 74A. The shaft 80 extends through hole 75A, 77 and 75B and terminates in a threaded end 87. The shaft 80 further includes two bearing surfaces 88A and 88B in a spaced relationship extending through the holes 75A and 75B in the flanges 74A and 74B. Monobearings 90A and 90B are mounted in the holes 75A and 75B in the flanges 74A and 74B and allow the U shaped beam 76 to rotate. A nut 92, with thrust washer 94, threadably engages the end 87 and secures the shaft 80 in place.

The ends 100A and 100B of the arm members 79A and 79B include holes 102A and 102B, respectively. A pin assembly 104 is provided joining the arms 79A and 79B of the U shaped member 76 to the leg 70. This pin assembly 104 includes a shaft 106 having a shoulder 108 at one end and threads 110 at the other end and includes thrust washers 111A, 111B 111C and 111D mounted thereon. The pin assembly is inserted through the holes 102A and 102B such that the shoulder 108 abuts the arm 79A and the threads 110 extend out of the arm 78B with the thrust washers 111A and 111B on either side of the arm 79A and thrust washers 111C and 111D on either side If arm 79B. A nut 112 engaging the threads 110 secures the pin assembly in place. And locking the U shaped member to the leg 70. Thus the beam 76 secures the teeter beam 66 to the plate 46, while allowing limited up air d down motion (and rocking motion) thereof with the air springs 56A and 56B providing support.

Still referring to FIG. 3 and additionally to FIG. 6, the air springs 56A and 56 B alone may be too stiff for testing of some aircraft. Thus the support assemblies 38A and 38B include accumulators 114A and 114B with a direct air path to the air springs to reduce their stiffness. The T shaped member 66 includes an upward post 116. The accumulators 114A and 114B are coupled together by a brace member 118 having an opening 120 adapted to fit about the post 116. The brace member 118 is attached to band clamps 122A and 122B wrapped about the accumulators 114A and 114B, respectfully. These accumulators 114A and 114B include an end fitting 126 With an outlet port 128, which are adapted to mate with ports 130 in communication with internal compartment 132 in the arms 68A and 68B, respectively of the T shaped member 66. A seal 134A in groove 134B provide seating. Thus the accumulators 114A and 114B lead directly into the air springs 56A and 56B via outlet tubes 136. A rod 140 is connected by a threaded end 142 to a threaded hole 144 within the arms 68A and 68B and extend through and out of hole 146 in the accumulators 114A and 114B and terminate in a threaded end 148. A sealing member 150 mounted on the rod 140 and a nut 152 threaded on end 148 secures the accumulators 114A and 114B and seal off the holes 146

Figure 9:
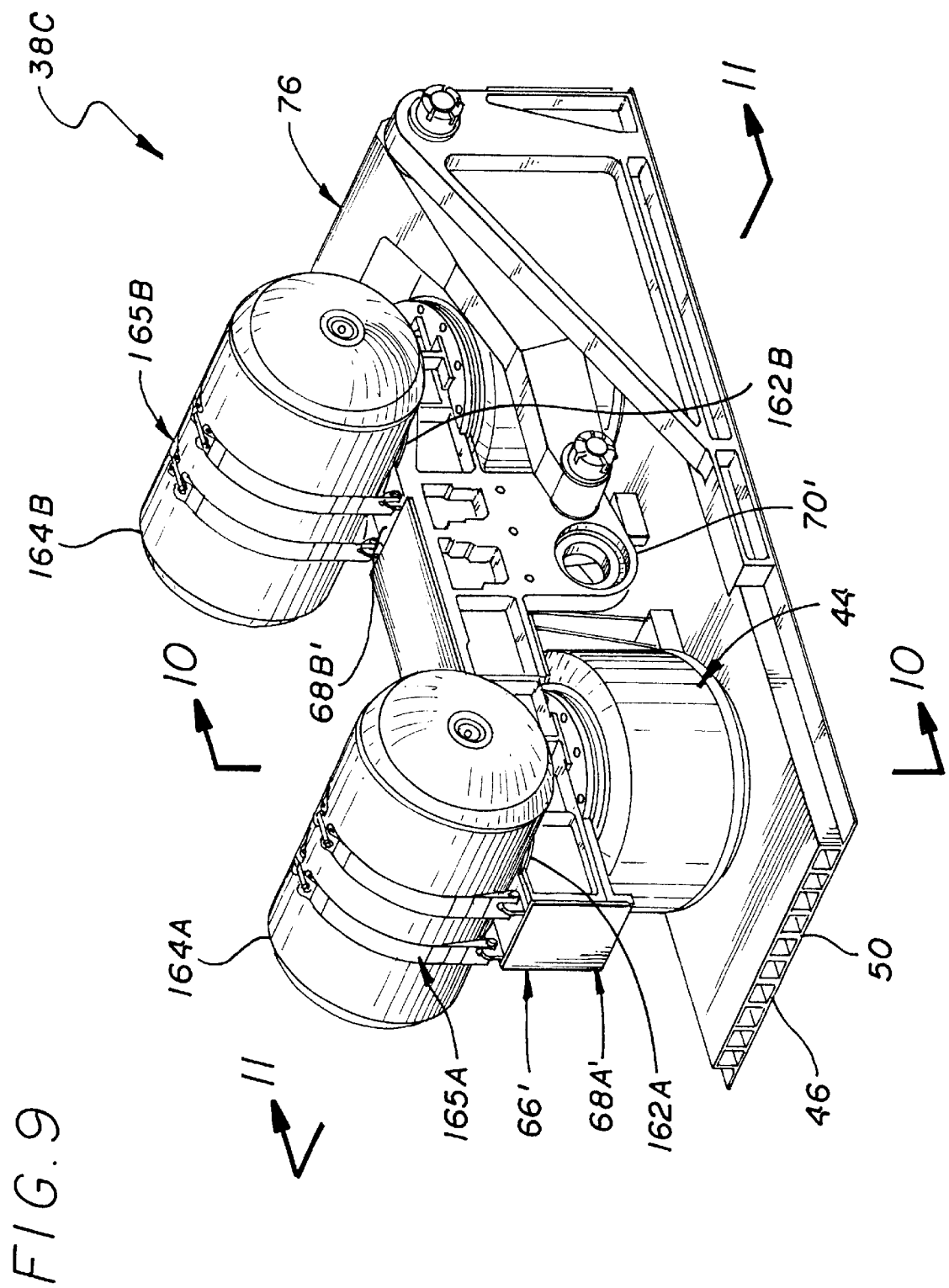
FIG. 9 is a perspective view the nose landing gear support assembly.
Figure 10:
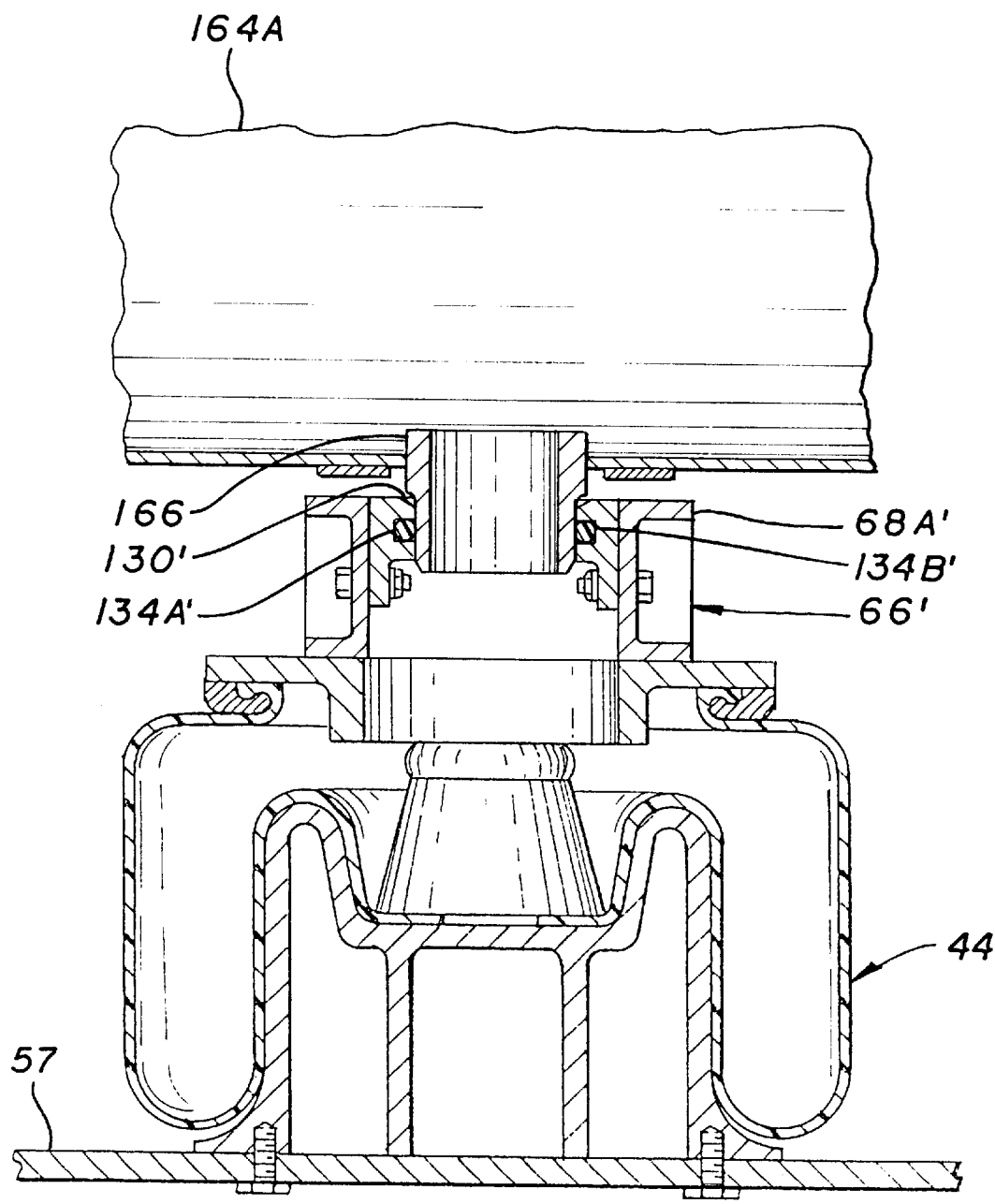
FIG. 10 is a cross-sectional view of FIG. 9 taken along the line 10—10 illustrating the air cushion and accumulator attachment.
Figure 11:
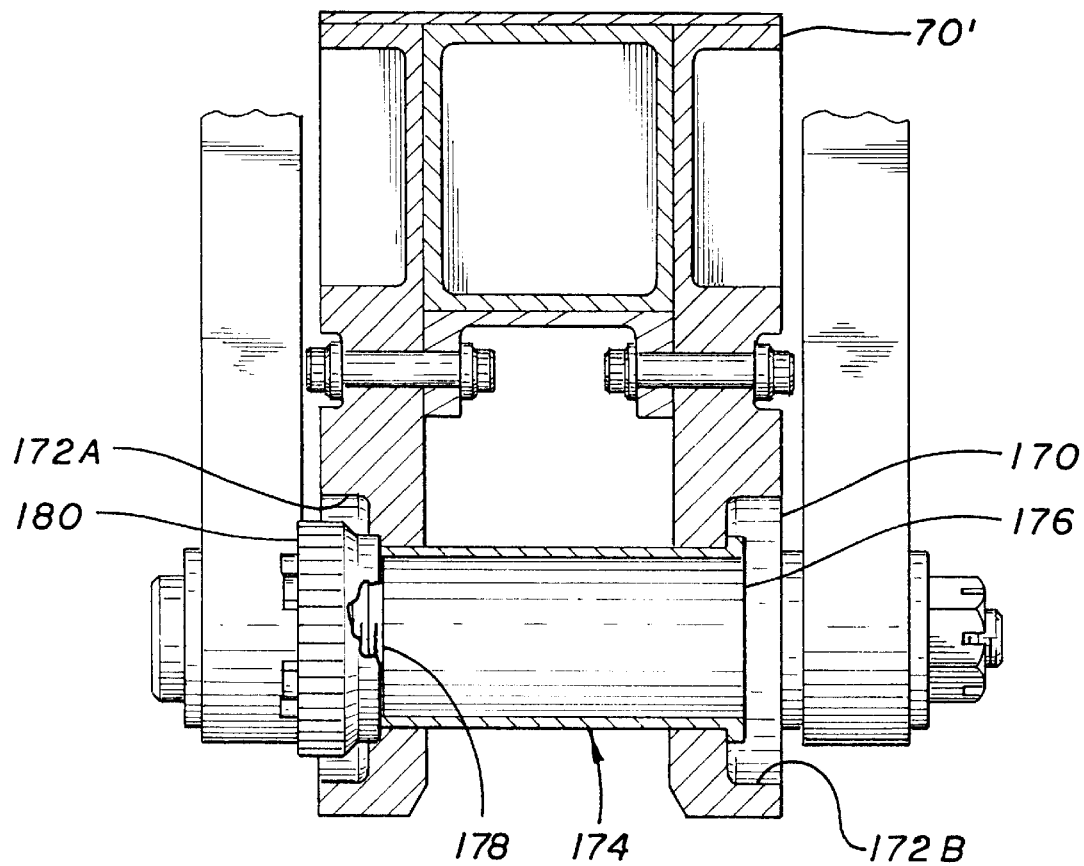
FIG. 11 is a cross-sectional view of FIG. 9 taken along the line 11—11 illustrating the mounting of-the nose landing gear to the support assembly.

Referring to FIGS. 9, 10 and 11, the nose landing gear support assembly 38C is similar to the support assemblies 38A and 38B. The teeter beam 66' includes arms 68A' and 68B' with the arms having circular notches 162A and 162B for receiving air accumulators 164A and 164B placed horizontally thereon. The accumulators 164A and 164B are secured thereto by band strap assemblies 165A and 165B. A tube 166 is located in the sides of the accumulators 164A and 164B and extends into port 130' in the arms 68A' and 68B'. A seal 134A' in groove 134B' seals off the port 130'

The central leg 70' further includes a hole 170 having counter-bores 172A and 172B at each side. A bearing assembly 174 for receiving the nose landing gear 30 wheel axle (not shown) of the aircraft 10 is mounted therein having a flanged end 176 and a threaded end 178. A nut 180 secures the bearing assembly 174 to the leg 70'. All other design features are similar to those found in support assemblies 38A and 38B. The difference between the nose landing gear and main landing gears is that a special bearing assembly 174 is used to mount the wheel thereto. Therefore, it is important to note that in many cases the nose landing gear will require different mounting techniques.

Figure 13:
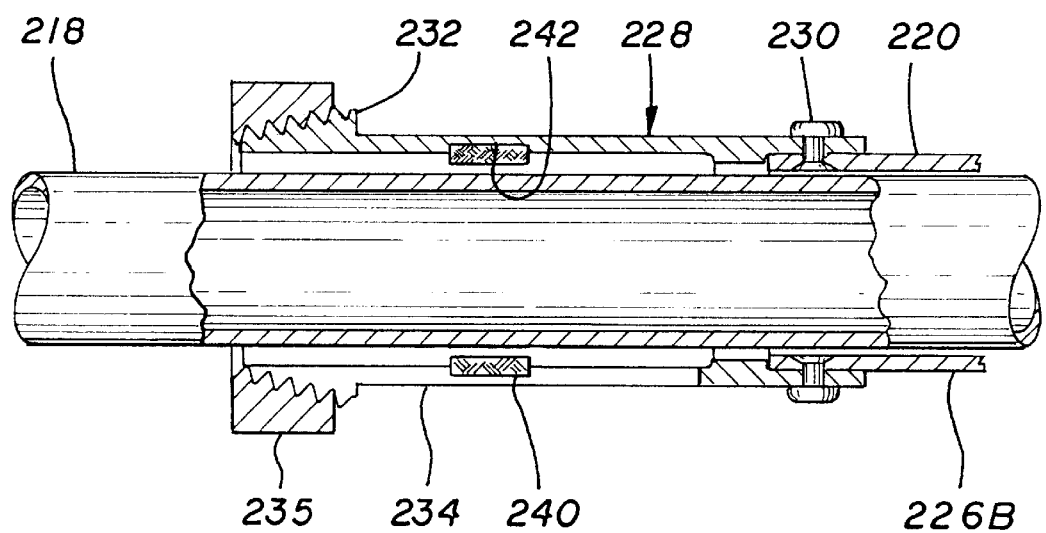
FIG. 13 is a cross-sectional view of FIG. 12 taken along the line 13—13 illustrating a friction-producing device.
Figure 12:
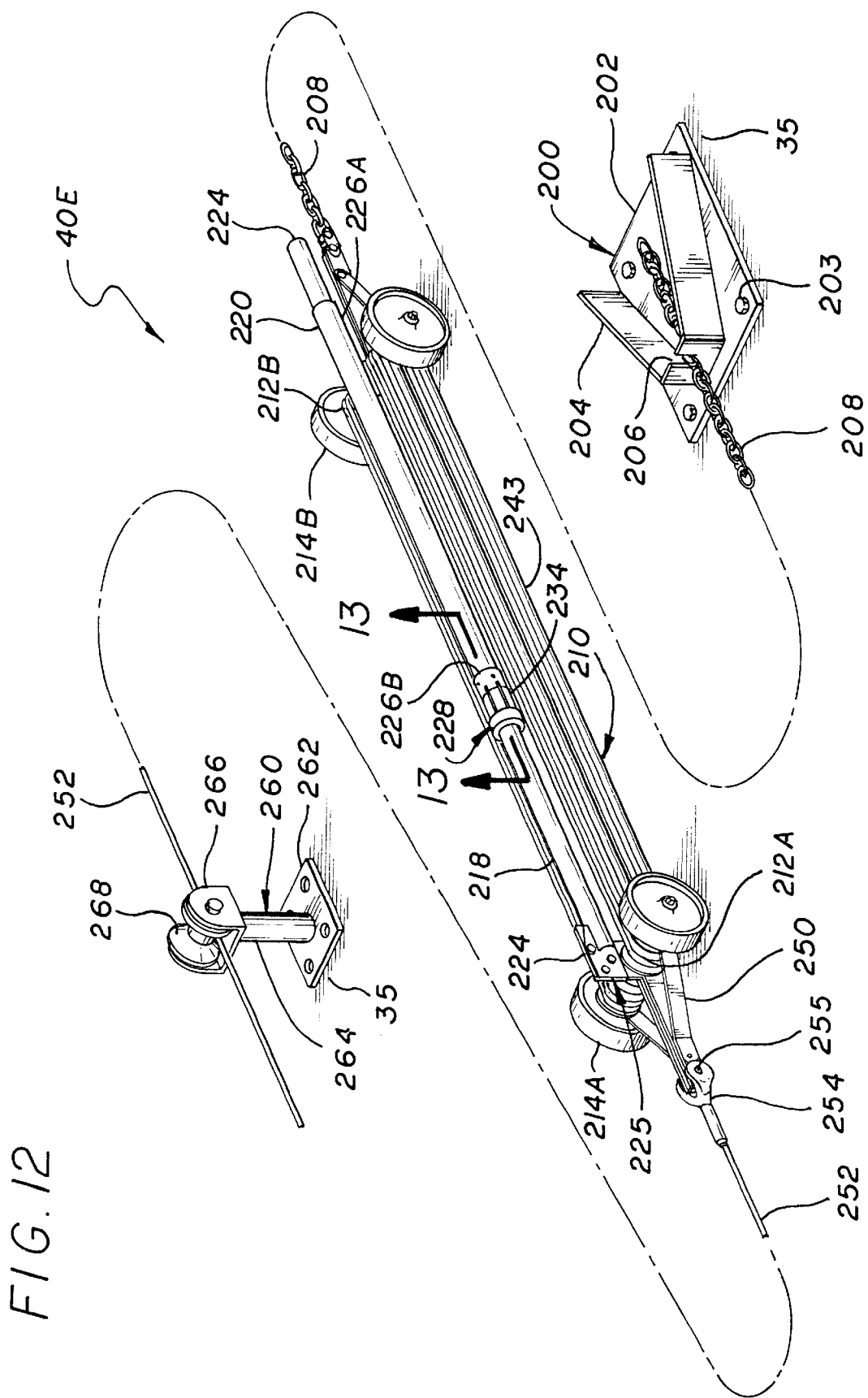
FIG. 12 is a perspective view of the restraint assembly shown in FIG. 2.

Referring to FIGS. 12 and 13, the restraint assemblies 40A–G are all-similar in construction. Thus the description will be limited to restraint assembly 40E. Restraint assembly 40E includes a rear attachment fitting 200 comprising a flat plate 202 attached to the ground 35 by means of fasteners 203. A V shaped structure 204 having a notch 206 at its apex for receiving locking the links of a chain 208. The restraint assembly 40E further includes a movable bungee assembly 210 having first and second axle assemblies 212A and 212B each having a pair of wheels 214A and 214B rotatably mounted thereto.

The first and second axle assemblies 212A and 212B are connected together by a pair of telescoping tubular members 218 and 220. The tubular member 218 is smaller in diameter than tubular member 220 and is connected by its end 224A to axle 212A by a plate assembly 225 and extends through the tubular member 218 having a second end 124 extending beyond the tubular member 220. The tubular member 220 is mounted at end 226A to the axle 212B and has a second end 226B terminating in a friction fitting 228 joined thereto by fasteners 230. The friction fitting 228 includes a tapered and threaded end 232, which has been split into a plurality of fingers 234. A plurality of friction pads 240 are bonded to the interior surfaces 242 of the fingers 234. A nut 235 engages the threaded and tapered end 232, such that tightening the nut causes the friction pads 240 to engage the tube 218 increasing the friction therebetween. A plurality of endless bungee cords 243 are wrapped about the axles 212A and 212B.

The axle 212A includes a lug fitting 250 extending outward therefrom parallel to the tubular members 218 and 220. A flexible cable 252 having a first end terminating in a cleaves 254 is pivotally attached to the fitting 250 by means of a pin 255 and a second end detachably attached to the main landing gear 32A. The cable 252 passes through a series of guides 260. The guides, 260 include a plate 262 mounted to the grid 36. A rod 264 extends upward therefrom and terminates in a U shaped fitting 266 having a cable guide; roller 268 therein. The cable 252 passes through these guides thus insuring that the any forces generated by the aircraft that are transmitted to the restraint systems 40A–G are parallel thereto. Thus depending upon the location of the restraint assembly 40A–40G, the number of guides 260 will very from one for restraint assembly 40A to three for restraint assembly 40B. Installation is accomplished by hooking up the cable 252 to the aircraft 10, and pulling the cable taught and hooking a link in the chain 208 to the notch 206 in the rear attachment fitting 200. The number of bungee cords 243 and the amount of friction induced by the friction fitting 228 will very with the type of test to be run.

Finally as illustrated in FIG. 2, as a safety precaution, weights 270 are attached by cables 272 to the wings 14 to prevent the aircraft from becoming airborne. These weighs 270 rest on the grid or on the floor of the pit. Air supply lines 276 from a controlled source 278 are used to pressurize the air cushions and air springs as required.

The present system is designed for use with the X-35B aircraft. Thus the following remarks are applicable to that aircraft. Other aircraft will require somewhat different sizes and operational air pressure, etc. The air casters generally operates at 25 psi. The exception is during engine off, heavy weight operations, where the main gear air casters must be energized to 30 psi. The nose landing gear, with less weight, rises about an inch. The main gear, with more weight, rises about ½ inch. With power on the ship, both will rise more, but not exceed 1 ½ inches. The air casters, when energized, have a break out friction of between 10 and 20 lbs. force at each gear location and a persistent drag of about half the break out force.

The air springs have two modes of operation. During engine off operations, the air springs are charged until the vehicle rises to the desired location. this can be done before or after the air casters are energized. During engine-on testing the air springs and accumulators are charged to a pressure that is expected to provide the necessary support during the test. The more power that is carried during the test, the less air pressure is needed in the air spring system. The exact pressures required for each test point is normally provided by simulator test. As power is increased, and lower pressures are necessary, the stiffness and natural frequencies fall off. At intermediate to high power settings the roll frequency will drop to near zero and pilot intervention is required to maintain a level aircraft.

Aircraft engine-off testing is all conducted with restraint system at all seven locations. External electrical, hydraulic and fuel power is brought up on the aircraft. The test begins by manually bringing the aircraft up on the air springs and stabilizing. The air casters are then energized and the test sequence started. The control sweeps are run and data taken. The air casters are then de-energized and the air springs vented until the Aircraft is at rest in the down position. There is no need to completely vent the air springs and accumulators. There is no soft support system requirement to engage or disengage either the springs or the casters first or last; however the aircraft will experience less internal loads if the air casters are de-energized last.

Engine on testing is broken into two major groups, vertical lift and aft vectored. In Vertical Lift mode the test is conducted with the restraint systems at all seven locations. The air spring and accumulators are charged to the appropriate pressure for the test that is to be run. The aircraft's engine is started with the nozzle facing aft, and stabilized, with all appropriate systems on line and operational. The engine thrust is maintained at idle. The transition from nozzle aft to nozzle and lift engaged is executed. This needs to occur at minimum thrust to prevent the aircraft from sliding on the vented skid plates. Once stabilized in the vertical lift mode, the air casters are energized and the aircraft will likely trim to a new location on the skid plates. The vertical lift system could be trimmed at this point to produce purely vertical lift, by monitoring the position of the aircraft. The power is then brought up to near the test point power and than slowly advanced until the vehicle lifts to the desired height. Both the gear and the soft support system will be extending, and the rise may be as much as 20 inches. The height and pitch, of the aircraft, are monitored by the observers (watching the links or the inclinometer readouts) and cues are forwarded to the pilot. The pilot is expected to monitor and trim roll on his own. The aircraft will have the same long period roll instability expressed in the static runs and the pilot will have to provide the correction. The deck angle that the aircraft sits at on the ground with the air spring bottomed and the air casters flat is about 2 degrees. The desired deck angle during the test sequence is the same, 2 degrees. The shut down sequence is to reduce power and lower the aircraft onto the internal stops. Continue to reduce power to idle. Shut down the air casters (for friction) and than convert to nozzle aft for engine idle cool down.

In aft vectored testing mode, the two aft restraint systems are removed and replaced with the thrust cables and a ridged ground attachment such as the attachment fittings 200 or the like. The air springs and accumulator are charged to the appropriate pressure for the test that is to be run. The aircraft engine is started with the nozzle facing aft, and stabilized, with all appropriate systems on line and operational. The engine thrust is maintained at idle. The transition from nozzle aft, to nozzle and lift engagement is executed. The air casters are energized (The air casters could be energized before the transition, as the cables will hold the aircraft in position). the aircraft will trim to a stable position, pulling on the cables. The power is brought to near the test point power and then slowly advanced until the vehicle lifts to the desired height. For many low angle settings of the test cases in this mode, the nose gear air springs and strut may be fully extended before the run starts and on the up stop strap. The aircraft may be setting statically nose high. Adding power will cause the nose air spring and strut to compress and the mains air springs to rise. For this special case, pitch and height are both impacted by the power level, and the nose strut may require special servicing. The shut down sequence is to reduce power and allow the aircraft to return to the internal stops. The nose air springs may go to the up stop, but the main air springs will always go down. There is no functional requirement to de-energize the air casters before transitioning to nozzles aft. The air casters are self-cooling while running and could remain energized until the plate temperature allows a lower temperature shutdown.

Thus it can be seen that the support system for ground testing an aircraft is ideally suited for testing a vertical takeoff and landing aircraft and can be used with other aircraft. Of course, modifications maybe be required as to the size of the individual components and air pressures required. It is obvious that the number of bungee cords will not only very from test to test, but for each location.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the aircraft industry, and in particular to aircraft testing.

What is claimed is:

1. A system for supporting a vertical take off and landing aircraft during hover tests about the ground, the aircraft having a longitudinal, vertical, and lateral axis, a nose landing gear and a main landing gear positioned rear therefrom on either side of the longitudinal axis, system comprising:

a bearing assembly having air bearings positioned under the nose and each main landing gear;

an air cushion assembly mounted to each of the air bearings, said air cushion assembly detachably coupled to each landing gear; and means to bias the aircraft to a specific position; such that the bearing assemblies allow horizontal motion above the ground and the air cushion provides for vertical movement of the aircraft above the ground.

2. The system as set forth in claim 1 wherein said means to bias the aircraft to a specific position includes:
   a first restraint assembly coupled between the nose landing gear and the ground positioned along the longitudinal axis;
   second and third restraint assemblies coupled between the main landing gear and the ground parallel to the longitudinal axis; and
   third and fourth restraint assemblies coupled between the main landing gear and the ground extending laterally outward from each side of the aircraft; and
   fifth and sixth restraint assemblies coupled between the fuselage aft of cockpit of the aircraft and the ground extending latterly outward from each side of the aircraft.

3. The system as set forth in claim 2 comprising said air cushion assemblies attached to the wheel axles of the landing gear.

4. The system as set forth in claim 3 wherein said restraining systems comprise:
   a cable assembly comprising:
      a first cable having first and second ends, said first end attached to the to the aircraft; and
      a second having first and second ends, said first end attached to the ground; and
   a spring assembly attached to and between said second ends of said first and second cables;
   such that said spring assemblies bias the aircraft to a centered position.

5. The system as set forth in claim 4 wherein said spring assembly comprises:
   a first wheel assembly coupled to said second end of said first cable;
   a second wheel assembly coupled to said second end of said second cable;
   a first tube having first and second ends, said first end attached to said first wheel assembly;
   a second tube having first and second ends, said first end attached to said second wheel assembly and a second end in slidable engagement with said second end of said first tube;
   means to adjust the sliding resistance between said second ends of said first and second tubes; and
   biasing means coupled between said first and second wheel assemblies for resisting movement of said first and second wheel assemblies apart from each other.

6. The system as set forth in claim 5 wherein said biasing means comprises at least one bungee cords attached between said first and second wheel assemblies.

7. The system as set forth in claim 6 wherein said means to adjust the sliding resistance between said second ends of said first and second tubes comprises:
   said second end of said second tube having an inwardly tapered threaded end, said tapered end having a plurality of longitudinal grooves forming a plurality of semi-flexible fingers, and
   a nut threadably engagable with said threaded end of said second end of said second tube:
   such that as said nut is treaded onto said second end of said second tube said plurality of semi-flexible fingers are forced in contact with said second end of said first tube increasing the slidable friction between said first and second tubes.

8. The system as set forth in claim 7 wherein each of said air cushion assemblies comprise:
   first and second air cushions mounted on said air bearing assemblies in a spaced relationship;
   a T shaped member having first and second arms and a leg, said leg extending downward between said pair of air cushions and said first and second arms positioned on top of said first and second air cushions, respectfully, She landing gear wheel axle mounted to said arm of said T shaped member;
   an arm having a first end pivotally connected to said air bearing and a second end pivotally connected to the leg of said T shaped member.

9. The system as set forth in claim 8 further comprising:
   a beam having a first and second ends, said first end of said beam attached to one end of said air bearing assembly, said beam extending vertically upward from one end of said bearing; and
   said first end of said arm pivotally connected to said second end of said beam.

* * * * *